United States Patent
Armstrong et al.

(10) Patent No.: US 8,306,435 B2
(45) Date of Patent: Nov. 6, 2012

(54) RECEPTION OF SIGNALS TRANSMITTED OVER A DISPERSIVE OPTICAL CHANNEL

(75) Inventors: Jean Armstrong, North Balwyn (AU); Arthur Lowery, Kew (AU)

(73) Assignee: Ofidium Pty, Ltd., Melbourne (AU)

( * ) Notice: Subject to any disclaimer, the term of this patent is extended or adjusted under 35 U.S.C. 154(b) by 530 days.

(21) Appl. No.: 12/527,112

(22) PCT Filed: Feb. 15, 2008

(86) PCT No.: PCT/AU2008/000199
§ 371 (c)(1),
(2), (4) Date: Feb. 16, 2010

(87) PCT Pub. No.: WO2008/098305
PCT Pub. Date: Aug. 21, 2008

(65) Prior Publication Data
US 2010/0142951 A1 Jun. 10, 2010

(30) Foreign Application Priority Data
Feb. 15, 2007 (AU) .............................. 2007900831

(51) Int. Cl.
*H04B 10/158* (2006.01)
(52) U.S. Cl. ........................................ 398/202; 398/183
(58) Field of Classification Search .................. None
See application file for complete search history.

(56) References Cited

U.S. PATENT DOCUMENTS

| 7,187,871 B1 | 3/2007 | Kaushik |
| 2002/0131135 A1 | 9/2002 | Chow et al. |
| 2004/0000635 A1 | 1/2004 | Wielandy et al. |

FOREIGN PATENT DOCUMENTS

| EP | 716516 B1 | 1/2003 |
| EP | 1841099 A1 | 10/2007 |
| WO | WO 91/04617 A1 | 4/1991 |
| WO | WO 2007/025346 A1 | 3/2007 |
| WO | WO 2007/041799 A2 | 4/2007 |

*Primary Examiner* — Danny Leung
(74) *Attorney, Agent, or Firm* — Woodcock Washburn LLP (57) ABSTRACT

A receiver for recovering transmitted information carried by a received optical signal that has been affected by dispersion includes an optical splitter having an input port arranged to receive the received optical signal, and a plurality of output ports. A proportion of optical power at the input port is transmitted to each of the output ports. A plurality of optical detectors is operably connected to respective output ports of the optical splitter, for generating a corresponding plurality of electrical signals. Optical phase shifters are disposed between the output ports of the optical splitter and respective optical detectors. As a result, each optical phase shifter applies a frequency dependent phase shift to an optical signal passing therethrough. An electronic processor includes analog and/or digital electronic components configured to combine two or more of the plurality of electrical signals, or information recovered separately therefrom, in order to provide improved accuracy or reliability of information recovery as compared with detecting and processing only the received optical signal. The receiver is advantageously able to mitigate the effects of frequency-dependent fading which may occur in intensity modulation/direct detection optical transmission systems due to dispersion in optical transmission paths.

18 Claims, 5 Drawing Sheets

RECEPTION OF SIGNALS TRANSMITTED OVER A DISPERSIVE OPTICAL CHANNEL

FIELD OF THE INVENTION

The present invention relates generally to optical communications, and more particularly to improved apparatus and methods for receiving information signals that have been affected by dispersion processes, such as chromatic dispersion, in the course of transmission.

BACKGROUND OF THE INVENTION

Optical transmission, in which an information signal is modulated onto an optical carrier, is widely employed in modern communication systems. In particular, many long-haul transmission networks employ single-mode optical fibres for the transmission of digital information at high bit rates, using one or more optical carriers, or wavelengths, over each fibre. Indeed, recent advances in optical technologies, including improvements in optical fibres, optical modulators, and the development of reliable and commercially practical optical amplifiers, have enabled the deployment of optical transmission paths capable of transporting on the order of 1 Tb/s over distances of thousands of kilometres, without the need for electronic regeneration. Individual optical channels in such systems typically carry information streams at rates of 2.5 Gbit/s, 10 Gbit/s, or even higher.

However, long-haul optical transmission systems are ultimately limited by distortion and degradation of the transmitted signals, arising primarily from dispersion (e.g. chromatic and polarisation mode dispersion), non-linear transmission processes, and noise introduced by optical amplifiers. Various techniques are known, or have been proposed, for overcoming, or at least mitigating, these various sources of signal degradation. Dispersion compensation, in particular, has been a very active area of research and commercial development in recent years. It is well known, for example, that linear dispersion processes, including chromatic dispersion, can be reversed by suitable optical equalisation means. However, equalisation in the optical domain has a number of disadvantages or limitations. The most practical, and widely deployed, means for the optical compensation of chromatic dispersion is to propagate dispersion-affected signals through a length of dispersion compensating fibre (DCF) which has been selected to have a total dispersion that is substantially an inverse of the dispersion accumulated in the transmission fibre. However, DCF represents an additional signal propagation path having its own attenuation and non-linear properties, and accordingly there is a limit to the amount of dispersion that can be compensated in this manner while maintaining adequate overall signal quality. Furthermore, the length of DCF used must be accurately matched to the transmission path, and potentially also to the transmission wavelength, or range of transmission wavelengths, and accordingly systems employing DCF for dispersion compensation may have limited flexibility and/or reconfigurability. Similar problems arise with alternative fixed optical equalisation means, such as dispersive optical filters or grating-based devices, and indeed such components are typically even more strongly wavelength dependent than DCF.

In order to mitigate the abovementioned problems and limitations of optical dispersion compensation methods, there has recently been increasing interest in the development of electronic dispersion compensation techniques. Previously, it had not been considered viable to perform significant signal processing within the electronic domain, when operating at the very high bit rates employed in long-haul optical transmission systems. However, with recent technological advances and improvements in electronic and digital systems and devices, very high speed analog and/or digital signal processing has become a practical option. This has led to the proposal and development of systems and apparatus providing various degrees of dispersion compensation within the electronic domain.

In order to fully compensate within the electronic domain for dispersion arising within the optical transmission channel, it is generally necessary to preserve phase information across the interface between the optical and electrical domains, in either the transmitter, the receiver, or both. For example, pre-compensation techniques involve the generation of an optical signal at a transmitter having amplitude and phase characteristics calculated such that, following transmission through a dispersive channel, the resulting optical signal detected at the receiver is substantially free of distortion due to dispersion. Alternatively, post-compensation techniques require that a received signal, affected by dispersion in the optical transmission channel, is detected such that the optical amplitude and phase information is preserved into the electronic domain, to enable full equalisation to be performed.

Conventionally, optical transmitters have employed intensity modulation, while direct detection has been used at the receiver. Intensity modulation and direct detection (IMDD) systems are thus generally the simplest, least costly, and most well-understood optical transmission systems. However, neither intensity modulation (which produces an optical signal, the power of which is proportional to the modulating electrical signal amplitude) nor direct detection (which produces a received electrical signal, the amplitude of which is proportional to detected optical power) preserves either the optical phase, or optical field amplitude, across the optoelectronic interface. It is therefore generally believed that IMDD systems are incompatible with the use of electronic dispersion compensation techniques.

Figure 1:
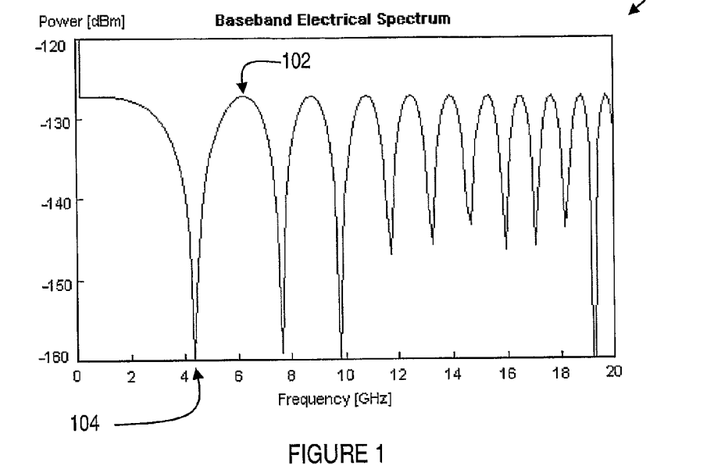
FIG. 1 shows a frequency response of an intensity modulated direct detection (IMDD) optical transmission system, resulting from chromatic dispersion in a transmission path.

One particular consequence of dispersion in IMDD systems is the generation of deep nulls within the received signal spectrum. This effect is illustrated in FIG. 1, which shows the frequency response 100 of an IMDD system resulting solely from the effects of chromatic dispersion in the optical transmission path (i.e. neglecting the frequency response of the transmitter and receiver components). The intensity-modulated optical signal includes upper and lower spectral sidebands, each of which experiences a different optical phase shift due to chromatic dispersion, relative to the optical carrier. At the receiver, in the process of direct detection, the spectral components of each sideband respectively mix with the optical carrier to produce a baseband electrical signal. Each frequency component of the electrical signal results from a corresponding sum of contributions from the respective upper and lower sideband components. These may interfere either constructively, to produce a peak in the RF frequency response (e.g. 102), or destructively, to produce a corresponding trough, or null, in the response (e.g. 104). The nulls in the frequency response effectively represent unusable portions of the spectrum, since the signal-to-noise ratio at such frequencies will be extremely poor. Accordingly, no electronic compensation method can effectively recover a signal having substantial information content within the spectral nulls of the frequency response 100.

It is accordingly an object of the present invention to provide a receiver apparatus, and corresponding method, which is able to mitigate the aforementioned problems of the prior art, to enable improved recovery of information signals that have been transmitted over a dispersive optical channel, and which is compatible with the use of intensity modulation and direct detection.

SUMMARY OF THE INVENTION

In one aspect, the present invention provides a receiver for recovering transmitted information carried by a received optical signal that has been affected by dispersion, including:

an optical splitter having an input port arranged to receive the received optical signal and a plurality of output ports, wherein a proportion of optical power at the input port is transmitted to each said output port;

a plurality of optical detectors operably connected to respective output ports of the optical splitter, for generating a corresponding plurality of electrical signals;

one or more optical phase shifters, each being disposed between an output port of the optical splitter and a respective one of said optical detectors, wherein the or each optical phase shifter applies a frequency-dependent phase shift to an optical signal passing therethrough; and an electronic processor for processing the plurality of electrical signals to recover said transmitted information, wherein said electronic processor includes analog and/or digital electronic components configured to combine two or more of the plurality of electrical signals and/or information recovered separately therefrom, to provide improved accuracy or reliability of information recovery as compared with detecting and processing only the received optical signal.

Advantageously, the provision of multiple received signal paths, in accordance with the present invention, having different frequency-dependent phase shifts applied thereto, enables the relative phase difference between the optical carrier, and respective upper and lower sidebands, to be different at each of the optical detectors. Accordingly, while the resulting electrical signal spectra at the output of each detector may still include deep nulls at particular frequencies, these nulls may be arranged to occur at different frequencies for each detector. Accordingly, by appropriately combining the electrical signals and/or the information recovered therefrom, it is advantageously possible to recover information corresponding with all portions of the electrical signal spectrum.

While it may be sufficient to provide an optical splitter having as few as two output ports, and two corresponding optical detectors, in some embodiments a larger number of output ports and detectors may be employed, with different frequency-dependent phase shifts disposed therebetween, so as to provide a greater selection of electrical signals having spectral nulls at different frequencies. Advantageously, such arrangements reduce the probability that two or more electrical signals will have nulls at or around the same frequency. This may be particularly useful when the dispersion of the optical channel is subject to change, such as in a reconfigurable network, since in such circumstances it may not be possible to know at the time of designing or deploying the receiver at what frequencies the nulls corresponding with the received optical signal, in the absence of an additional phase shift, will occur. The use of additional output ports and detectors may also be useful in the presence of polarisation mode dispersion, which can result in additional frequency-dependent phase shifts, over and above those caused by chromatic dispersion.

The optical splitter preferably includes one or more passive optical coupling devices, arranged or selected to provide a desired power-splitting ratio between the input port and each output port. Suitable coupling devices include biconical tapered fibre couplers, planar waveguide couplers, polarising beam-splitters (PBS) or bulk optic power splitters, including micromachined devices, and so forth. The optical splitter may include a single stage having one input and two or more outputs, or may include multiple, cascaded stages. For example, two stages of 1×2 couplers may be used to form a four-output optical splitter. Different devices may be used in each cascaded stage, such as a first stage including a PBS, and a further stage including fibre or planar waveguide couplers.

The optical splitter may be configured to transmit a substantially equal proportion of received optical power to each output port. Generally, it will be advantageous to arrange for substantially equal power to be received at each detector. Accordingly, if there is an optical attenuation associated with the optical phase shifters, it may be desirable to adjust the power-splitting ratios to compensate for the attenuation in the different paths between the splitter outputs and the corresponding detectors.

The optical detectors are preferably direct detection devices, such as PIN photodiodes, or avalanche photodiodes (APDs). However, various other optical detection arrangements known in the art of optical communications may be employed. It will be appreciated that various electronic components, including filters, amplifiers and the like, may be coupled to the optical detectors in order to provide corresponding electrical signals that are suitable for further processing.

The optical phase shifters may include any suitable dispersive optical elements, or other devices capable of providing a frequency-dependent optical phase shift. These may include dispersive waveguide devices, optical filter devices, fibre-grating devices, and the like. In one particularly simple embodiment, the optical phase shifters may include suitable lengths of dispersive optical fibre.

In some embodiments, the electronic processor includes analog electronic components for combining the electrical signals generated by the optical detectors to produce a combined electronic signal for further processing to demodulate and/or decode the information carried therein. Alternatively, the signals may be sampled and digitised (e.g. using analog-to-digital converters) and then combined digitally prior to further processing. In such embodiments, it will be appreciated that a single analog/digital processing path is provided for demodulation and decoding of the combined electrical signal, in order to recover the transmitted information.

In alternative embodiments, the information carried in each electrical signal is demodulated and/or decoded prior to combining, whereby a plurality of analog/digital processing paths is provided, corresponding with each of the electrical signals. Preferably, each electrical signal is sampled and digitised to enable much of the processing to be performed in the digital domain.

In preferred embodiments, the transmitted signal is a digital signal modulated onto an optical carrier using a plurality of sub-carriers. Each processing path of the electronic processor is then preferably configured to demodulate and decode the corresponding electrical signal to recover a corresponding plurality of information streams of said plurality of sub-carriers. Respective information streams of each processing path may then be combined to recover the transmitted information, whereby improved accuracy or reliability of information recovery is achieved from the combined information streams.

According to one approach, the electronic processor may be configured to determine a measure of quality, such as a signal-to-noise ratio or sub-carrier signal power, corresponding with each sub-carrier on each electrical signal path, and to combine the electrical signals by selecting the sub-carriers having the highest quality, in order to recover the transmitted information. Alternatively, the processor may be configured to combine respective information streams for corresponding sub-carriers of each processing path prior to final recovery of the transmitted information.

In particularly preferred embodiments, the sub-carriers are generated in accordance with orthogonal frequency division multiplexing (OFDM) techniques. The application of OFDM techniques in optical transmission systems has previously been disclosed in international patent application publication no. WO 2007/025346 and international patent application publication no. WO 2007/041799, both of which are incorporated herein in their entirety by reference. Advantageously, OFDM enables a very high level of control to be exercised over the modulation and demodulation of information onto a plurality of sub-carriers. For example, it is possible to encode information onto a large number of orthogonal frequency sub-carriers, and for the electronic processor to decode or demodulate this information utilising efficient digital processing techniques, such as the fast Fourier transform (FFT). Additionally, compensation of the amplitude variations and phase shifts experienced by each sub-carrier due to dispersion in the optical channel is readily performed within the electronic processor using frequency domain equalisation techniques, such as those described in the aforementioned international patent applications.

In another aspect, the present invention provides a method of recovering transmitted information carried on a received optical signal that has been affected by chromatic dispersion, the method including the steps of:

dividing the received optical signal into a plurality of optical signal components, each including a proportion of received optical power;

applying a frequency-dependent phase shift to at least one of said optical signal components;

detecting the optical signal components to generate a corresponding plurality of electrical signals; and processing the plurality of electrical signals to recover the transmitted information, wherein said processing step includes combining two or more of the plurality of electrical signals and/or information recovered separately therefrom, to provide improved accuracy or reliability of information recovery as compared with detecting and processing only the received optical signal.

Further preferred features and advantages of the invention will be apparent to those skilled in the art from the following description of preferred embodiments of the invention, which should not be considered to be limiting of the scope of the invention as defined in the preceding statements, or in the claims appended hereto.

BRIEF DESCRIPTION OF THE DRAWINGS

Preferred embodiments of the invention are described with reference to the accompanying drawings, in which.

DETAILED DESCRIPTION OF PREFERRED EMBODIMENTS

Figure 2A:
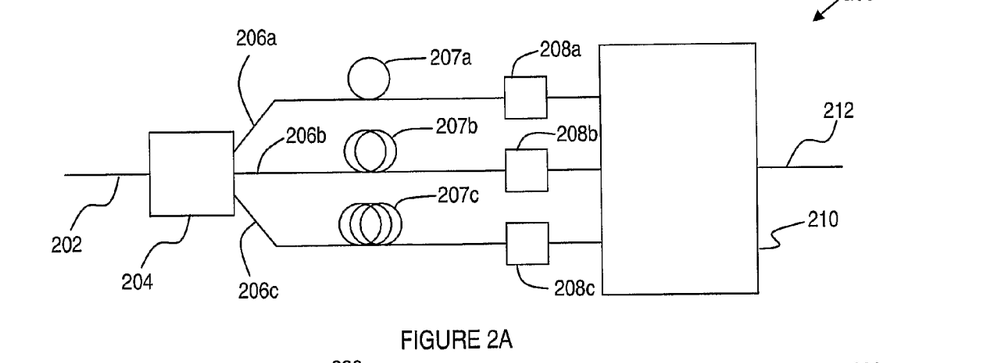
FIG. 2A illustrates schematically a receiver in accordance with a preferred embodiment of the invention.

In FIG. 2A there is illustrated schematically a receiver 200 in accordance with a preferred embodiment of the present invention. The receiver 200 has an input port 202, which is arranged to receive a received optical signal that has been transmitted over an optical channel having a dispersive transmission characteristic. An optical splitter 204 has a plurality of output ports, e.g. 206a, 206b, 206c, and a proportion of the optical power received at the input port 202 is transmitted to each of the output ports. The optical splitter 204 may include one or more passive optical coupling devices, arranged or selected to provide a desired power-splitting ratio between the input port 202 and each output port 206a, 206b, 206c. Suitable coupling devices, such as biconical tapered fibre couplers, planar waveguide couplers, polarising beam-splitters (PBS) and so forth, will be apparent to persons skilled in the art of optical communications.

Corresponding with the output ports 206a, 206b, 206c of the splitter 204, there are provided a plurality of optical detectors 208a, 208b, 208c. Each optical detector is connected to a respective output port of the optical splitter 204 via an optical phase shifter 207a, 207b, 207c. One or more such optical phase shifters may be provided, and each phase shifter applies a frequency-dependent phase shift to an optical signal passing therethrough. Generally, it is desirable that a different frequency-dependent optical phase shift is applied to the signals output from each output port 206a, 206b, 206c of the optical splitter 204. In some embodiments, one of the paths connecting the optical splitter 204 to a corresponding optical detector e.g. 208a, may include no optical phase shifter. While various forms of frequency-dependent optical phase shift may be employed, according to a particularly convenient implementation of the receiver 200, a frequency-dependent optical phase shift may be achieved in each path by using a suitably selected length of dispersive optical fibre. The optical splitter 204 may be configured to transmit a substantially equal proportion of received optical power to each output port 206a, 206b, 206c. However, it is more preferable that a substantially equal optical power be received at each detector 208a, 208b, 208c. Accordingly, considering that the optical phase shifters 207a, 207b, 207c may have corresponding differing optical attenuation, the power-splitting ratio of the splitter 204 may be adjusted to compensate for such differing attenuation in the corresponding paths between the splitter outputs and the corresponding detectors.

The outputs of the optical detectors 208a, 208b, 208c are connected to corresponding inputs of an electronic processor 210, details of the operation of which are described in greater detail below with reference to FIGS. 3, 6 and 8. The receiver 200 has an output port 212, at which recovered information transmitted on the received optical signal is output. The electronic processor 210 includes analog and/or digital electronic components configured to combine two or more of the electrical signals received from the detectors 208a, 208b, 208c and/or information recovered separately therefrom, in order to provide improved accuracy or reliability of information recovery at the output 212, as compared with detecting and processing only the optical signal received at the input port 202.

Figure 2B:
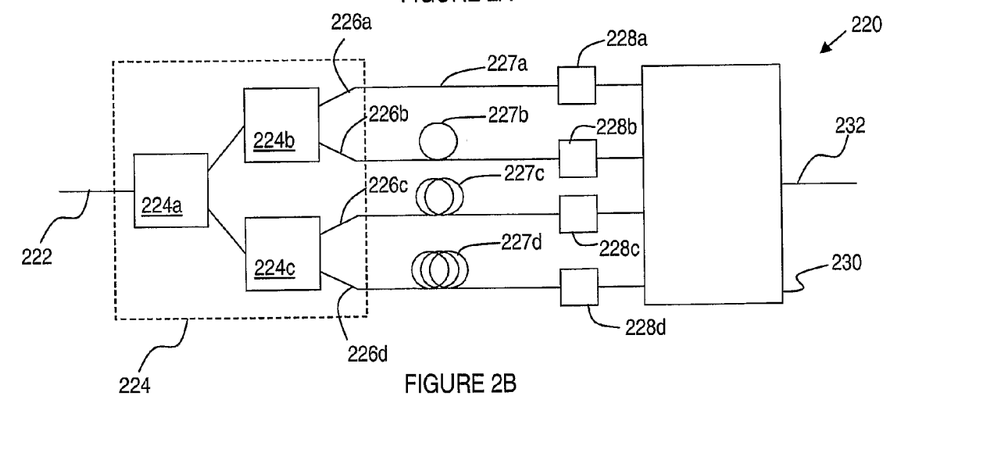
FIG. 2B illustrates an alternative receiver arrangement in accordance with another embodiment of the invention.

FIG. 2B illustrates schematically a further receiver arrangement in accordance with another embodiment of the present invention. The receiver 220 again has an input port 222, which is arranged to receive a received optical signal that has been transmitted over an optical channel having a dispersive transmission characteristic. An optical splitter 224 is constructed in accordance with a two-stage design including a first stage splitter 224a and second stage splitters 224b, 224c. In the arrangement depicted in receiver 220, each of the splitters 224a, 224b, 224c has a single input port and two output ports, and the stages are cascaded in such a way that optical power received at the input port 222 is divided between the four output ports 226a, 226b, 226c, 226d. Each individual splitter 224a, 224b, 224c may include one or more passive optical coupling devices, arranged or selected to provide a desired power-splitting ration between the input port and each corresponding output port. Suitable coupling devices again include biconical tapered fibre couplers, planar waveguide couplers, PBS, and so forth.

In some embodiments, the type of optical splitting device utilised in each stage of the multistage optical splitter 224 may be different. For example, the first stage device 224a may be a PBS, while the second stage devices 224b, 224c may be biconical tapered fibre couplers or planar waveguide couplers. In such an arrangement, optical power in that portion of the input signal having a first state of polarisation is transferred to second stage splitter 224b, while optical power in that portion of the input signal having a second, orthogonal, polarisation state is transmitted to the other second stage splitter 224c. An arrangement of this type enables the receiver 220 to incorporate polarisation diversity in combination with the diversity achieved through the use of differential phase shift or delay in the various internal optical paths.

Corresponding with the output ports 226a, 226b, 226c, 226d of the splitter 224, there are provided a plurality of optical detectors 228a, 228b, 228c, 228d. Each optical detector is connected to a respective output port of the optical splitter 224 via an optical phase shifter 227a, 227b, 227c, 227d. The function of these phase shifters in the receiver 220 is as previously described, in relation to the corresponding components of the receiver 200.

The output of the optical detectors 228a, 228b, 228c, 228d are connected to corresponding inputs of an electronic processor 230, the function of which is described in greater detail below with reference to FIGS. 3, 6 and 8. The receiver 230 has an output port 232, at which recovered information transmitted on the received optical signal is output.

Figure 3:
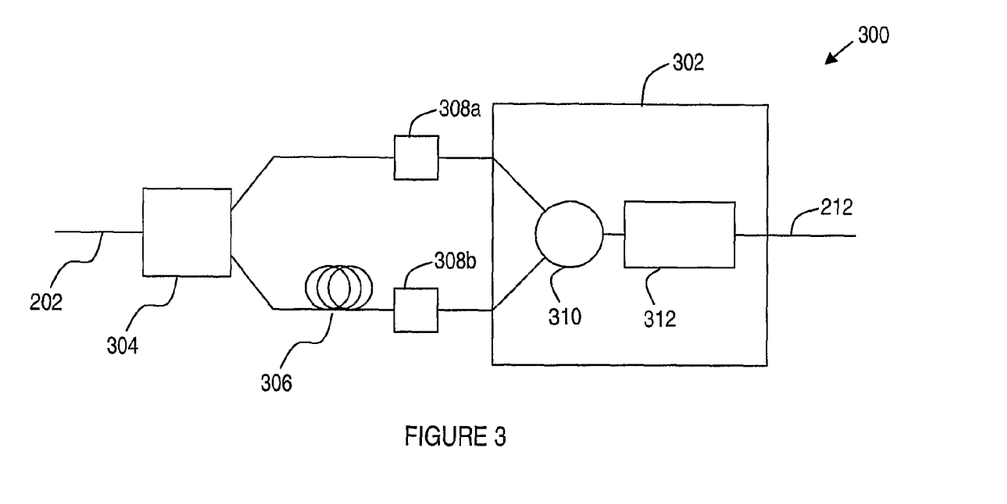
FIG. 3 illustrates schematically a receiver including signal combination and a single processing path in accordance with one embodiment of the invention.

FIG. 3 is a block diagram illustrating schematically a receiver 300, and including further detail of an electronic processor 302, according to one embodiment of the invention.

According to the embodiment 300, an optical splitter 304 has two output ports, respectively operably connected to optical detectors 308a, 308b. A first output port of the optical splitter 304 is directly connected to detector 308a, for example via a short length of optical fibre, such that substantially no additional phase shift is introduced in the signal detected by the detector 308a. A second output port of the splitter 304 is connected to the optical detector 308b via frequency-dependent optical phase shifter 306. According to the embodiment 300, the phase shifter 306 is a suitably configured passive optical device, such as an optical filter, grating, or the like, which introduces a 180 degree phase shift at frequencies above an optical carrier frequency of the received optical signal, relative to frequencies lying below the optical carrier frequency.

Figure 4A:
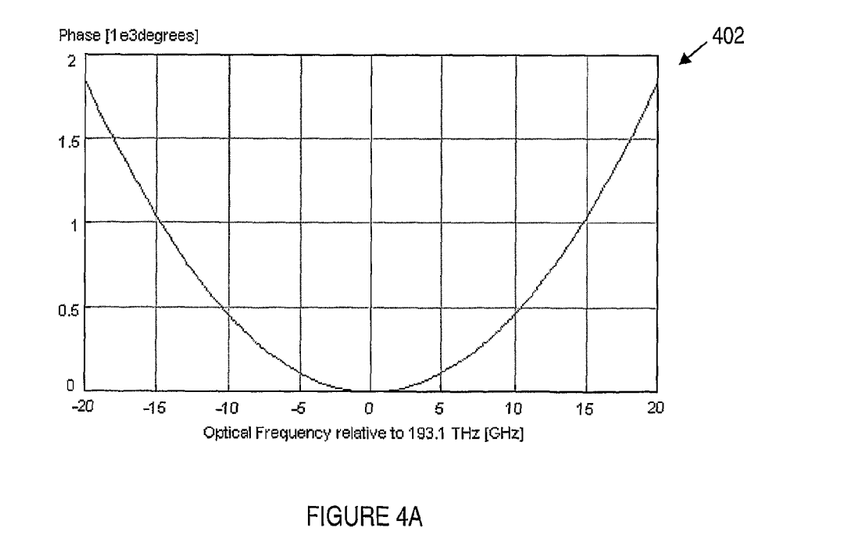
FIG. 4A shows a total optical phase shift due to dispersion of an unshifted input of the receiver of FIG. 3.
Figure 4B:
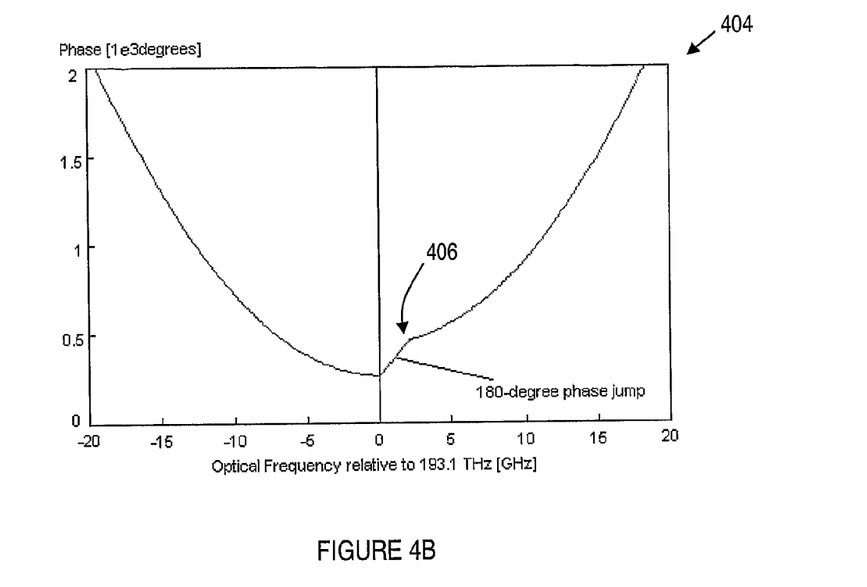
FIG. 4B shows a total optical phase shift due to dispersion and an additional phase shift of 180 degrees at frequencies above the optical carrier frequency at a shifted input of the receiver of FIG. 3.

FIG. 4A illustrates an optical phase shift 402 due to dispersion in the optical transmission path, representing the total optical phase shift experienced by the transmitted signal at the "unshifted" detector 308a. FIG. 4B shows a corresponding total optical phase shift 404 at the input of "shifted" optical detector 308b. As can be seen, a 180 degree phase "jump" 406 is present in the total phase shift near the optical carrier frequency, resulting in an additional 180 degree phase shift in frequencies above the optical carrier frequency, relative to those below the optical carrier frequency.

Figure 5:
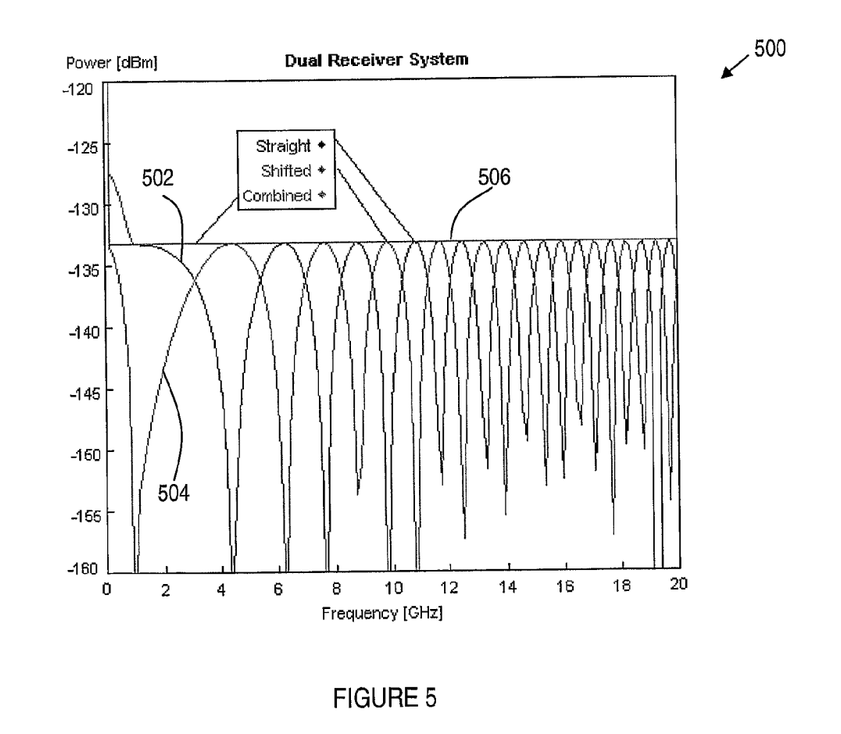
FIG. 5 shows a frequency response of an IMDD optical transmission path for unshifted, shifted and combined received signals in the receiver of FIG. 3.

FIG. 5 is a graph 500 which shows the overall frequency response 502 corresponding with the unshifted input, and the modified frequency response 504 corresponding with the shifted input. As can be seen, the effect of the additional 180 degree phase shift introduced by the phase shifter 306 is to cause corresponding peaks in the overall frequency response 504 to coincide with the nulls in the unshifted frequency response 502. It will therefore be apparent that, at frequencies within the received electrical spectrum at the unshifted detector 308a at which the electrical signal is weak and signal quality accordingly poor, a relatively strong and high-quality signal will be available at the electrical output of the detector 308b, and vice versa.

One approach to combining the detected signals within the signal processor 302 would therefore be to arrange the processor such that, for each signal bearing frequency component within the received electrical spectrum, the stronger, higher quality, detector output is selected. In some embodiments, this is indeed a practical approach, which is discussed in greater detail below with reference to FIGS. 6 to 8. However, in the embodiment 300, an alternative approach is applied. Specifically, the electronic signal processor 302 includes a signal combiner 310, for combining the respective electrical outputs of the detectors 308a, 308b. The signal combiner 310 may include analog electronic components, and may be, for example, a passive electrical power combiner. Alternatively, analog-to-digital converters and associated electronics may be operably connected to the electrical outputs of the detectors 308a, 308b, for the purpose of sampling and digitizing the respective detected signals. The function of the combiner 310 may then be performed within the digital domain.

By arranging for the electrical signals at the combiner 310 to be in quadrature with respect to one another, the combiner 310 may perform a simple summation of the signals in order to produce a combined signal having the total electrical spectrum 506 illustrated in the graph 500 of FIG. 5. As can be seen, the overall frequency response 506 for the combined signals is substantially flat across a broad range of electrical frequencies. Advantageously, therefore, according to the embodiment 300 the invention is able to substantially mitigate the effect the spectral nulls that occur in IMDD optical transmission systems having dispersive transmission paths.

Since combining of the detected signals is performed at combiner 310, prior to further processing, the signal processor 302 requires only a single processing path 312, which may be an analog processing path, a digital processing path, or a combined analog/digital processing path, depending on requirements, and upon whether or not the combiner 310 is implemented in the analog or digital domain. While various means and methods of processing may be employed, corresponding with the particular modulation format of the received optical signal, in particularly preferred embodiments the transmitted signal is a digital signal modulated onto an optical carrier using a plurality of sub carriers, most preferably in accordance with an orthogonal frequency division multiplexing (OFDM) method. Suitable processing components and steps corresponding with such signals are described in greater detail below, particularly with reference to FIGS. 7 and 8.

Figure 6:
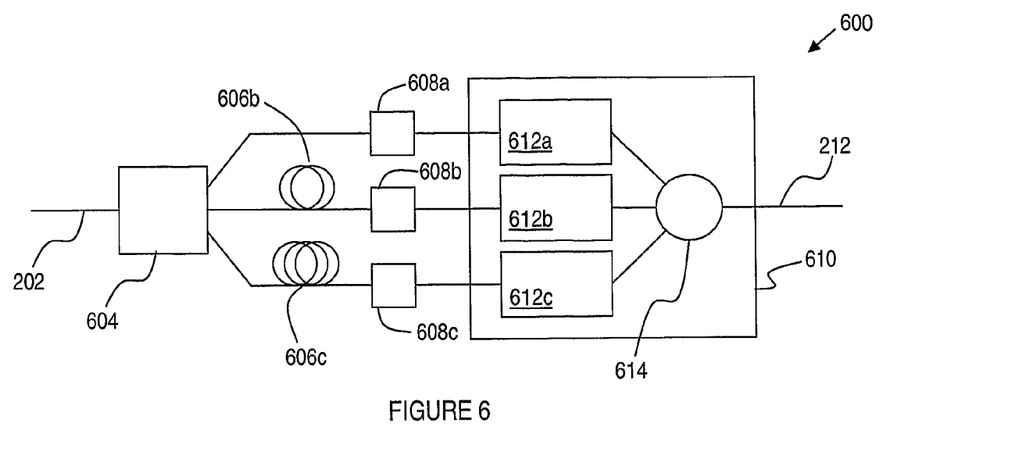
FIG. 6 is a block diagram of a receiver processor including multiple processing paths and subsequent combination according to a further embodiment of the present invention.

FIG. 6 illustrates a receiver 600 according to a further embodiment of the invention, and in particular includes a more detailed block diagram of a receiver processor 610 including multiple processing paths 612a, 612b, 612c, with subsequent combination of recovered signal information at combiner 614. In the particular embodiment 600 shown in FIG. 6, an optical splitter 604 has three outputs, respectively operably connected to detectors 608a, 608b, 608c. Disposed between the splitter 604 and the detectors 608b, 608c are respective frequency-dependent optical phase shifters 606b, 606c. The phase shifters 606b, 606c may be for example, respective differing lengths of dispersive optical fibre. Since the total dispersion experienced by the optical signals detected at the respective detectors 608a, 608b, 608c is different, their corresponding electrical frequency responses will exhibit peaks and nulls which, generally, will not coincide for all three detected signals. Accordingly, at any specified electrical frequency, it may be expected that there will be at least one detector, the output of which includes a stronger, and higher quality, signal component at that frequency. It will therefore be appreciated that by using a larger number of detectors, and corresponding phase shifters, the prospects of a sufficiently high quality signal being available at all frequencies of interest at least one detector output may be increased.

As noted above, according to particularly preferred embodiments of the invention, the transmitted optical signal is a digital signal modulated onto an optical carrier using a plurality of sub-carriers. The electronic processor, e.g. 210, 302, 610, may then be configured to demodulate and decode the detected electrical signal to recover a corresponding plurality of information streams of the plurality of sub-carriers. It may be particularly convenient to generate the sub-carriers in accordance with OFDM techniques, and in this regard the application of OFDM to optical transmission systems has previously been disclosed in International patent application publication nos. WO 2007/025346 and WO 2007/041799.

Figure 7:
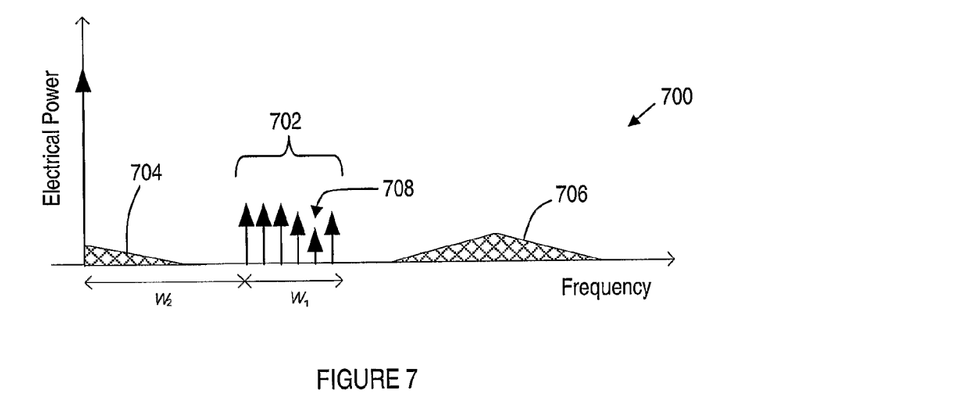
FIG. 7 shows schematically a received OFDM signal spectrum according to an embodiment of the invention.

FIG. 7 illustrates schematically a received electrical signal spectrum 700 corresponding with an optical OFDM transmitted signal in a dispersive IMDD optical transmission system. The electrical signal spectrum 700 includes information bearing OFDM sub-carriers 702, and lower and upper intermodulation distortion products 704, 706, formed in the process of "square law" direct detection. The OFDM signal spectrum 702 has accordingly been composed to ensure that the intermodulation distortion products 704, 706 fall outside the signal bandwidth.

As a result of phase differences accumulated due to dispersion between upper and lower side bands of the intensity-modulated optical signal, as described previously with reference to FIG. 1, each of the OFDM sub-carriers 702 experiences differing degrees of constructive/destructive interference such that some sub-carriers, e.g. 708, experience potential severe fading or attenuation. However, in accordance with the present invention, the sub-carriers that experience the most severe fading will be different at each respective detector 608a, 608b, 608c.

Accordingly, in the embodiment 600 the signal processor 610 includes three distinct signal processing paths 612a, 612b, 612c each of which may generally include a combination of analog and digital electronic components.

Figure 8:
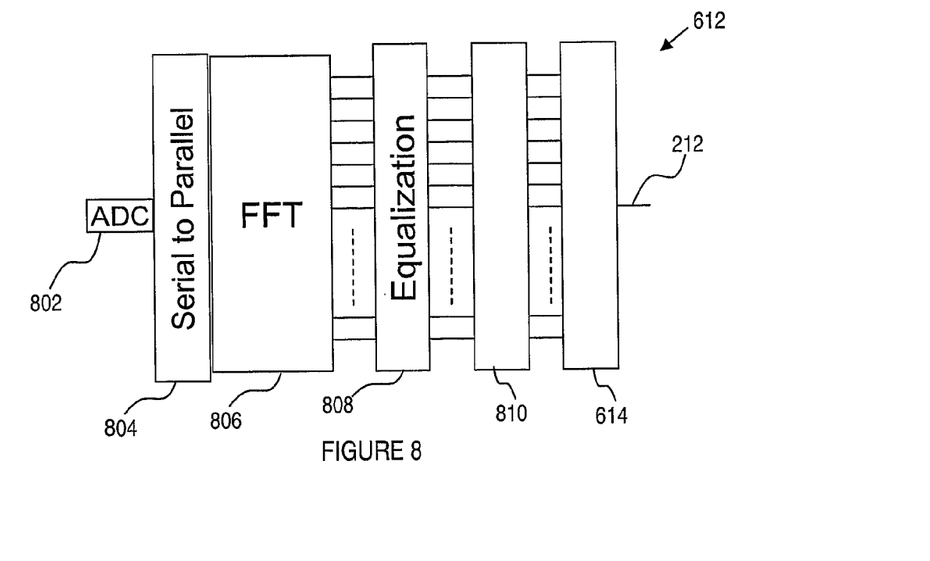
FIG. 8 is a block diagram of an OFDM digital processing path according to an embodiment of the invention.

FIG. 8 illustrates schematically a block diagram of an exemplary signal processing path 612, corresponding with a series of analog or digital components, and/or digital signal processing steps.

In particular, the exemplary signal processing path 612 includes an analog to digital converter 802, for sampling and digitizing a detected signal. A serial-to-parallel converter 804 converts the sequence of digitised samples output from the analog-to-digital converter 802 into a corresponding parallel sequence. This is input to Fast Fourier Transform (FFT) block 806, the output of which, according to OFDM methods, is a set of parallel sampled signal values wherein each parallel output of the FFT 806 corresponds with one of the OFDM sub-carriers 702. Amplitude and phase equalisation 808 may be performed on each parallel output value, in order to compensate for the effects of dispersion in the transmission path. The outputs of the equalizer 808 are input to a corresponding parallel set of demapping units 810, which receive the equalized symbol values and generate corresponding bits of recovered digital information. Each respective output, corresponding with a particular OFDM sub-carrier, may be compared and/or combined with corresponding outputs of additional signal processing paths (e.g. 612a, 612b, 612c) by combiner 614, in order to produce recovered digital information at the output 212 that is of improved quality (i.e. having increased accuracy and/or reliability) as compared with utilising only a single detector and signal processing path in the presence of dispersion-induced frequency-dependent signal fading.

As will be appreciated by those skilled in the art of digital signal processing, the various components or processing steps illustrated in the exemplary signal processing part 612 may be implemented using dedicated digital signal processing integrated circuits, and/or via a software implementation, such as suitable digital signal processing software code executed on one or more digital signal processors and/or general purpose processors. Further details of the relevant OFDM processing steps are provided in the aforementioned International patent application publication nos. WO 2007/025346 and WO 2007/041799.

Furthermore, as noted above in relation to the discussion of FIG. 3, the exemplary signal processing path 612 may also be used in the embodiment 302, for processing of a single, pre-combined, electrical signal.

Figure 9A:
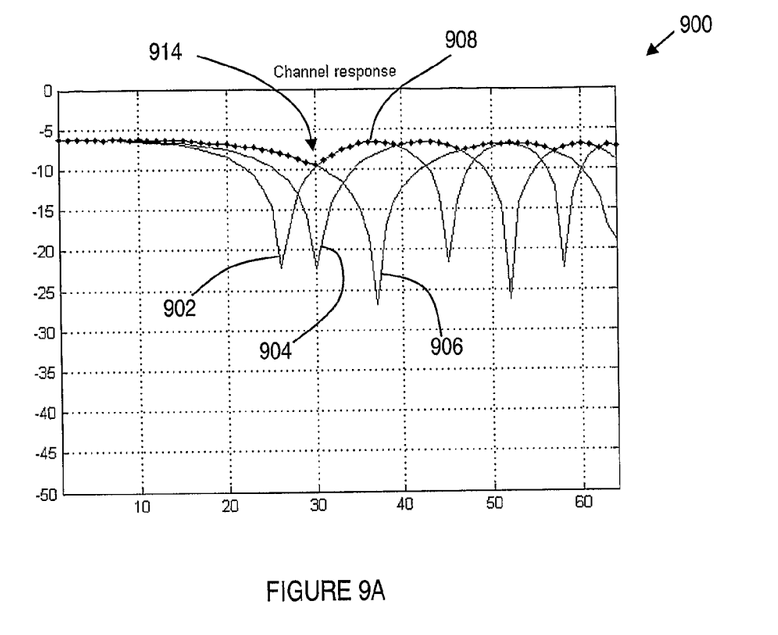
FIG. 9A illustrates a channel response for received OFDM signals having different applied phase shifts according to an embodiment of the invention.
Figure 9B:
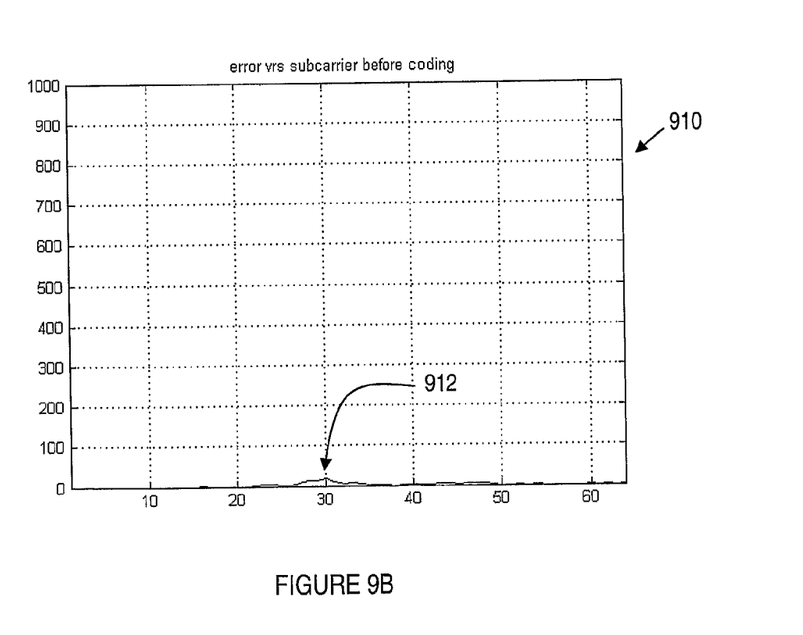
FIG. 9B is a graph of errors versus sub-carrier number corresponding with the combined channel response of FIG. 9A.

Turning now to FIG. 9A there is shown a graph 900 including channel responses 902, 904, 906 corresponding with three separate optical detectors, e.g. 608a, 608b, 608c at which the same received optical signal has experienced differing amounts of chromatic dispersion, by including additional dispersive elements, e.g. 606b, 606c, into at least two of the received signal paths. As a result, each channel response exhibits strong channel attenuation, or fading, in different groups of channels. The set of solid points 908 represents the best available signal quality for each OFDM sub-carrier channel, selected from the three available channel responses 902, 904, 906. As will be seen, it is possible by such selection for all OFDM channels to avoid the loss of signal quality, and correspondingly high error rate, associated with the deep nulls in the respective channel responses. In FIG. 9B there is shown a graph 910 of the number of errors as a function of sub-carrier number. A peak 912 in the error count is apparent at around channel number 30, which corresponds with the point 914 in the combined frequency response graph 900. In this particular embodiment, and for this particular sub-carrier channel, none of the three available detectors provides a sufficiently high quality signal to avoid these errors. However, it will be appreciated that the two detectors corresponding with the channel responses 902, 906 provide a significantly improved received signal, as compared with the detector corresponding with response 904. In accordance with response 904, severe attenuation occurs around channel number 30, for which it would be expected that no information could be recovered in this channel, or in a number of adjacent channels. Overall, with the use of suitable error correction coding, it is possible to achieve zero errors by utilising the receiver 600, having three detectors 608a, 608b, 608c with corresponding channel responses 902, 904, 906. This performance would be unachievable using a prior art receiver with only a single detector, and without the introduction of additional phase shifts 606b, 606c in order to provide a diversity of channel responses.

In the embodiment 600, as described above, the signal combiner 614 is a digital signal combiner (i.e. implemented using digital signal processing technology) which measures the channel strength and/or channel signal-to-noise ratio for each sub-carrier channel processed by each of the three processing paths 612a, 612b, 612c, and for each sub-carrier selects the highest quality available signal for incorporation into the final recovered signal output 212. It will be understood that this technique represents only one possible method of combining the signals processed in each of the signal processing paths and that in alternative implementations it may be possible for the combiner 614 to utilise information from all of the paths, for example outputs of the equalizers 808, and to combine this information in order to provide signal recovery which is still further improved as compared with selecting the output of any one signal path alone. In particular, considering the channel 30 depicted in the graphs 900, 910, it is noted that although both channel responses 902, 906 exhibit approximately equal fading at the frequency point 914, corresponding with channel 30, it may be possible to combine these signals prior to demapping and/or making a final decision on the corresponding received symbol value, in order to provide a reduced overall probability of decision error. It is particularly to be noted that in many implementations the most significant source of errors, e.g. 912, may be receiver noise, and that this type of noise, introduced primarily in the optical detectors 608a, 608b, 608c and associated electronics, is independent and uncorrelated across the corresponding signal paths. It is therefore reasonably to be expected that a suitable method of combining the signals in corresponding sub-carrier channels will result in an improved overall signal-to-noise ratio for each sub-carrier channel.

While particular embodiments of the present invention have been described herein, by way of example, it will be understood that the invention is not so limited, but rather that the scope of the invention is defined by the claims appended hereto.

The invention claimed is:

1. A receiver for recovering transmitted information carried by a received optical signal that has been affected by dispersion such that a frequency spectrum of a corresponding detected electrical signal exhibits peaks and troughs of signal strength, the receiver including:
   an optical splitter having an input port arranged to receive the received optical signal and a plurality of output ports, wherein a proportion of optical power at the input port is transmitted to each said output port;
   a plurality of optical detectors operably connected to respective output ports of the optical splitter, for generating a corresponding plurality of electrical signals;
   one or more optical phase shifters, each being disposed between an output port of the optical splitter and a respective one of said optical detectors, wherein each optical phase shifter applies a frequency-dependent phase shift to an optical signal passing therethrough, whereby a frequency shift is induced in the peaks and troughs of signal strength in a corresponding detected electrical signal; and
   an electronic processor for processing the plurality of electrical signals to recover said transmitted information,
   wherein said electronic processor includes analog and/or digital electronic components configured to combine two or more of the plurality of electrical signals and/or information recovered separately therefrom, to provide improved accuracy or reliability of information recovery as compared with detecting and processing only the received optical signal by utilizing one or more peaks of signal strength in the frequency spectrum of at least one of the electrical signals to compensate for corresponding troughs in signal strength of at least another one of the electrical signals.

2. A receiver according to claim 1, wherein the optical phase shifters include dispersive optical elements and/or devices configured to provide a frequency dependent optical phase shift.

3. A receiver according to claim 1, wherein the phase shifters are lengths of dispersive optical fibre.

4. A receiver according to claim 1 wherein the electronic processor includes analog and/or digital electronic components for combining the electrical signals generated by the optical detectors to produce a combined electronic signal for processing to demodulate and/or decode information carried therein.

5. A receiver according to claim 1, wherein the electronic processor includes a plurality of analog/digital processing paths, wherein each electrical signal is demodulated and/or decoded prior to combining.

6. A receiver according to claim 5 wherein the transmitted signal is a digital signal modulated onto an optical carrier using a plurality of sub carriers, and each processing path of the electronic processor is configured to demodulate and decode a corresponding electrical signal to recover a corresponding plurality of information steams of said plurality of sub-carriers.

7. A receiver according to claim 6, wherein the electronic processor is configured to determine a measure of quality, such as a signal to noise ratio or sub-carrier signal power, corresponding with each sub-carrier on each electrical signal path, and to combine the electrical signals by selecting the sub-carriers having the highest quality, in order to recover the transmitted information.

8. A receiver according to claim 6, wherein the processor is configured to combine respective information streams for corresponding sub-carriers of each processing path in order to provide an improved quality electrical signal for recovery of the transmitted information.

9. A receiver according to claim 6, wherein the sub-carriers are generated in accordance with Orthogonal Frequency Division Multiplexing (OFDM) techniques.

10. A receiver according to claim 1 wherein the optical splitter includes one or more passive optical coupling devices.

11. A receiver according to claim 10 wherein the passive optical coupling devices include one or more of: biconical tapered fibre couplers; planar waveguide couplers; and polarising beam-splitters.

12. A receiver according to claim 10 wherein the optical splitter includes two or more cascaded stages of passive optical coupling devices.

13. A receiver according to claim 12 wherein at least one said stage includes a polarising beam-splitter.

14. A method of recovering transmitted information carried on a received optical signal that has been affected by chromatic dispersion such that a frequency spectrum of a corresponding detected electrical signal exhibits peaks and troughs of signal strength, the method including the steps of:
dividing the received optical signal into a plurality of optical signal components, each including a proportion of received optical power;
applying a frequency-dependent phase shift to at least one of said optical signal components whereby a frequency shift is induced in the peaks and troughs of signal strength in a corresponding detected electrical signal;
detecting the optical signal components to generate a corresponding plurality of electrical signals; and
processing the plurality of electrical signals to recover the transmitted information,
wherein said processing step includes combining two or more of the plurality of electrical signals and/or information recovered separately therefrom, to provide improved accuracy or reliability of information recovery as compared with detecting and processing only the received optical signal by utilizing one or more peaks of signal strength in the frequency spectrum of at least one of the electrical signals to compensate for corresponding troughs in signal strength of at least another one of the electrical signals.

15. A method according to claim 14 wherein the step of applying a frequency dependent phase shift includes passing said optical signal component through a dispersive element and/or device.

16. A method according to claim 14 wherein the step of applying a frequency-dependent phase shift includes passing said optical signal component through a length of dispersive optical fibre.

17. A method according to claim 14 wherein the plurality of optical signal components include distinct components having different states of polarisation.

18. A method according to claim 17 wherein said different states of polarisation are substantially orthogonal.

* * * * *